United States Patent [19]

Parks, Jr.

[11] 4,219,586

[45] Aug. 26, 1980

[54] AUGER PRESS

[76] Inventor: George W. Parks, Jr., 314 36th St., Snyder, Tex. 79549

[21] Appl. No.: 906,037

[22] Filed: May 15, 1978

[51] Int. Cl.$^2$ ............................................. A23K 1/04
[52] U.S. Cl. .................................. 426/647; 426/641; 426/807; 99/527; 100/147
[58] Field of Search ............... 426/641, 647, 511, 480, 426/495, 478; 99/527; 100/147, 148, 73, 117

[56] References Cited

U.S. PATENT DOCUMENTS

| | | | |
|---|---|---|---|
| 609,057 | 8/1898 | Sorensen | 426/641 X |
| 783,560 | 2/1905 | Wheelwright | 100/73 |
| 3,135,193 | 6/1964 | Hunt | 100/147 |
| 3,527,642 | 9/1970 | Harrison et al. | 426/641 |
| 3,615,651 | 10/1971 | Parks | 426/641 |
| 3,706,571 | 12/1972 | Dufault | 426/511 |
| 4,117,776 | 10/1978 | Hunt | 100/147 |
| 4,122,208 | 10/1978 | Tronstad | 426/641 |

*Primary Examiner*—R. B. Penland
*Attorney, Agent, or Firm*—Wendell Coffee

[57] ABSTRACT

Blood from a slaughterhouse is gelatinized in a gelatinizer by adding steam and heat thereto. The blood is blown by additional steam pressure from the gelatinizer into an auger press thereby force feeding the press. The gelatinous mass is first squeezed gently to remove the liquids therefrom and during the latter stages is pressed more firmly to remove more of the liquids. The liquids are directed to a filter tank, while the solid gelatinous mass is directed to an offal cooker with offal.

2 Claims, 2 Drawing Figures

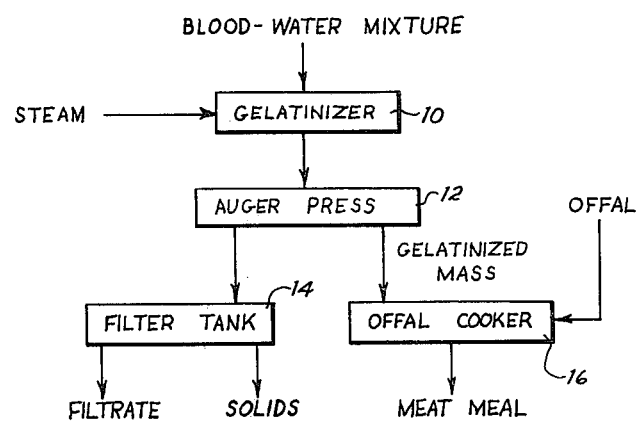
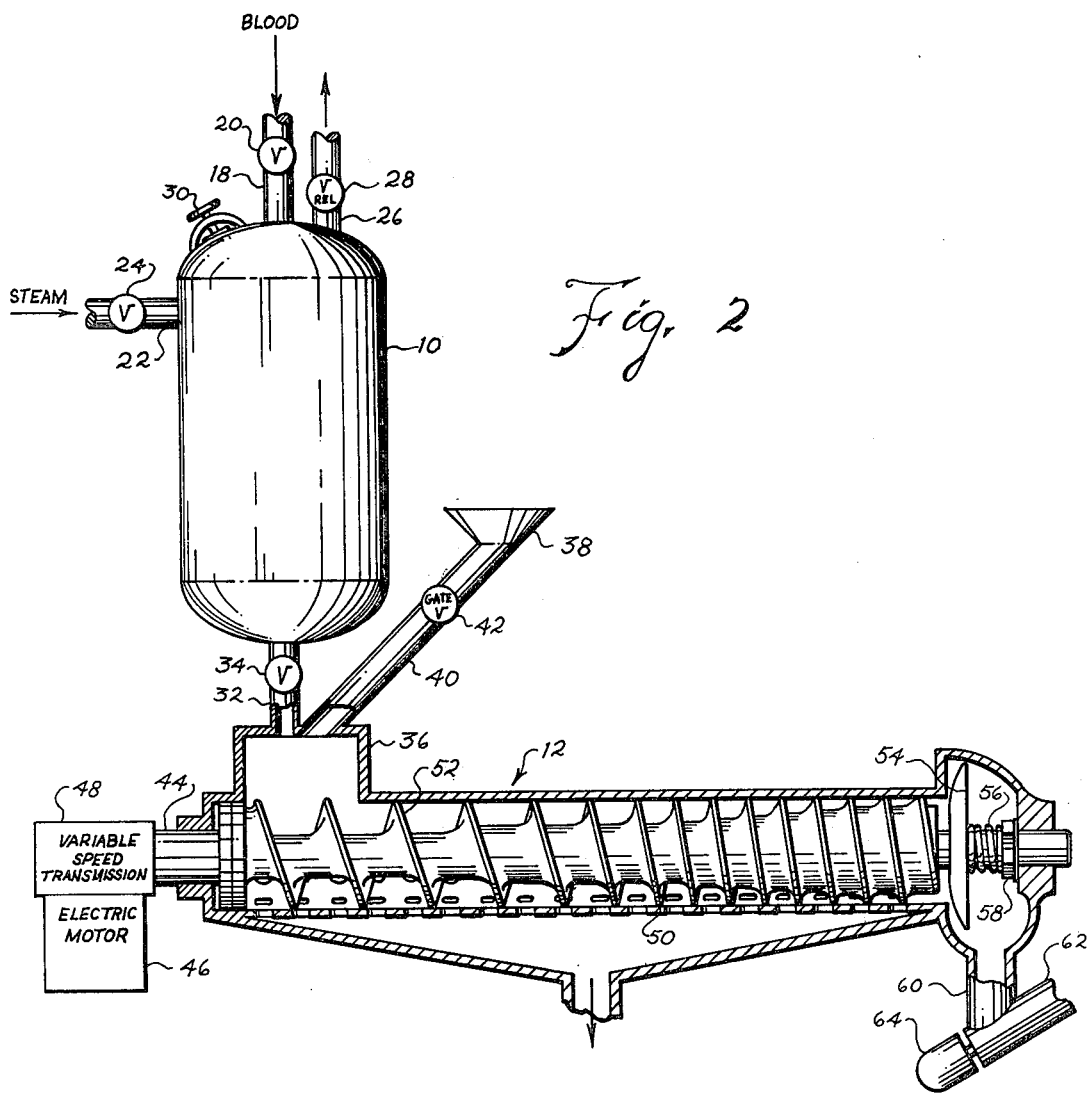

AUGER PRESS

BACKGROUND OF THE INVENTION (1) Field of the Invention

This invention relates to processing slaughterhouse waste and more particular to the treatment of blood and preparing meat meal from the treated blood and offal.

(2) Description of the Prior Art

As pointed out in my prior patent, U.S. Pat. No. 3,615,651, issued Oct. 26, 1971, animal blood is rich in feed value, particularly protein. Most of this feed value is found in the solid parts of the blood and a negligible amount is found in the liquid part of the blood. The use of blood in animal feed is difficult, because according to methods in commercial use today, the concentration of the solid portion is a long and difficult task. Even with the disclosure of my prior application for gelatinizing the blood, there is a great deal of liquid to dispose of. In my prior application the liquid was removed by vaporization.

Before my invention, various types of presses were known. Particularly, the auger presses were known and examples of auger presses include:

| | |
|---|---|
| Bussells | 643,891 |
| Anderson | 829,314 |
| Anderson | 1,321,351 |
| Simon | 2,421,763 |
| McDonald | 2,701,518 |
| Ginaven | 3,115,087 |
| Hoffmann | 3,606,831 |
| Bird et al. | 3,982,483 |

SUMMARY OF THE INVENTION (1) New and Different Function

I have found a more efficient and satisfactory method of operation is to press the liquid from the gelatinized blood after it has been gelatinized as disclosed in my previous patent. Although other types of presses might be used, I have found it more advantageous to use auger presses as similar to those disclosed in the prior art, although in each event they were used for a completely different purpose than I have so advantageously utilized them in this invention. After the separation of the liquid from the gelatinous mass of blood, the solid portions are mixed with offal to be cooked as previously known.

Thus, it may be seen that the total function of my invention is far greater than the sum of the function of the individual parts of the tanks, valves, augers, perforated cylinders, etc.

(2) Objects of this Invention

An object of this invention is to utilize slaughterhouse blood.

An object of this invention is to prepare a high protein meat meal from the separated solid portion of blood mixed with offal and bones.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a block diagram showing the steps of my invention.

FIG. 2 is a schematic representation of the equipment used to practice my invention.

DESCRIPTION OF THE PREFERRED EMBODIMENT

Referring to the drawing, there may be seen in FIG. 1, gelatinizer 10 which by the use of steam and heat as disclosed by my prior U.S. Pat. No. 3,615,651 gelatinizes the solid particles of the blood. The products of the gelatinizer are fed to auger press 12 where the liquid is separated from the gelatinized or gelatinous mass. At least 50% of the liquid will be squeezed from the gelatinized mass in the auger press 12. The liquid is fed to a filter tank 14 where this is filtered to separate any solids remaining therein.

The gelatinous mass from the press 12 is fed to an offal cooker together with offal and bones where they are mixed together to form the meat meal.

Referring to FIG. 2, there may be seen a schematic representation of the equipment. The gelatinizer 10 includes blood feed line 18 with blood valve 20 therein. Often the water will be discharged with the blood into the gelatinizer. There is also a steam line 22 entering the gelatinizer 10 with steam valve 24 therein. Also there is a vent line 26 with vapor relief valve 28 leading from the gelatinizer as well as a manhole or inspection plate 30.

The gelatinizer includes a blow pipe 32 with exit valve 34 from the lowest part of the gelatinizer. It is emphasized that FIG. 2 is a schematic representation and the gelatinizer might well be mounted at the same level or a lower level from the auger press 12 and not immediately above it as represented in FIG. 2. Also those with skill in the art will understand there might be a plurality of gelatinizers 10 connected to a header or manifold leading to the single auger press 12. Also, it will be understood that FIG. 2 is not meant to represent the relative sizes or dimensions of the gelatinizer 10 and the auger press 12, but the gelatinizer 10 could be many times larger than the auger press.

However, it will be emphasized that normally the gelatinizer 10 force feeds the gelatinous mass and liquids into feed chamber 36 of the auger press 12. The feed chamber 36 is located at one end of the auger press which is hereby called the "feed end". It will be emphasized also that the material could be gravity fed into the auger press 12 if desired. E.g., if it were desired to remove some of the liquids from the offal before feeding it to the offal cooker, they could be fed through a catch basin or funnel 38 through gravity pipe 40 into the feed chamber 36. The gravity pipe will have a gate valve therein so it can be opened and there is no obstruction to this material as it may be fed through, but, also, it may be closed so as to prevent a backflow when the auger press 12 is being force fed from gelatinizer 10 through gate valve 42.

I prefer to drive mandrill 44 of the auger press 12 from electric motor 46 through variable speed transmission 48. The mandrill extends through perforated cylinder 50 of the auger press. Auger flights 52 upon the auger press are spaced widely apart at the feed end adjacent to the feed chamber of the auger press and are close together at the other end which is called the "press end". Also the mandrill 44 has a much greater diameter at the press end than at the feed end, as may be seen.

Because of its design, it may be seen that as the material is first fed to the auger press, there is only slight pressure or force upon the material to force the liquid through the perforations of the perforated cylinder 50. However, as the material proceeds through the auger and is augered therethrough, the pressure upon the material increases so that at the press end there is much greater pressure. I have found that this is desirable because if too much pressure is initially exerted against the material, the gelatinous mass tends to break down and the solids will pass through the perforations along with the liquid. However, after 30% to 50% of the liquid is removed from the gelatinized mass, the mass tends to adhere and has less tendency to flow through the perforations of the perforated cylinder 50.

The amount of pressure exerted on the solids is determined by spring biased end plate 54. This spring biased end plate has a convex surface adjacent to the auger flights and is telescoped over the end of the mandrill and is biased by spring 56 against the material. Adjustment nut 58 may be used to increase the tension of the spring 56 so more or less pressure may be applied against the gelatinous mass as it is moved from the auger. The gelatinous mass drops through chute 60 into a conveyor 62 where it is conveyed to the offal cooker. Conveyor 62 is powered by electric motor 64. Thus, it may be seen that the chute 60 operates to remove the gelatinous mass from the press.

The feed chamber 36 may be thought of as a "Y" having two legs, one being the blow pipe 32 and the other being the gravity pipe 40.

In operation, the gelatinous mass is moved from the gelatinizer to the auger press by closing all of the outlets on the gelatinizer and then opening the exit valve 34 and, also, opening the steam valve 24 to inject steam into the gelatinizer, thus increasing pressure in the gelatinizer until the gelatinous mass is forced through the blow pipe 32, thus force feeding the press.

As an aid to correlating the terms of the claims to the exemplary drawing, the following catalog of elements is provided:

| | |
|---|---|
| 10 gelatinizer | 38 catch basin |
| 12 auger press | 40 gravity pipe |
| 14 filter tank | 42 gate valve |
| 16 offal cooker | 44 mandrill |
| 18 blood feed line | 46 electric motor |
| 20 blood valve | 48 variable speed trans. |
| 22 steam line | 50 perforated cylinder |
| 24 steam valve | 52 auger flights |
| 26 vent line | 54 end plate |
| 28 relief valve | 56 spring |
| 30 inspection plate | 58 adjustment nut |
| 32 blow pipe | 60 chute |
| 34 exit valve | 62 conveyor |
| 36 feed chamber | 64 motor |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A method of preparing blood solids from fresh blood for mixture with raw offal to make meat meal for animal feed comprising:
    a. charging blood and water into a gelatinizer, then
    b. gelatinizing the blood by
       (i) adding live steam, and
       (ii) adding heat, thereafter
    c. closing all outlets on the gelatinizer, then
    d. opening an exit valve of the gelatinizer, then
    e. injecting steam into the gelatinizer, thus increasing pressure in the gelatinizer until the gelatinous mass is forced through a blow pipe and thus force feeding an auger press, therein
    f. augering the gelatinous mass through a perforated cylinder,
    g. squeezing at least 50% of the moisture therefrom,
    h. exerting greater pressure on the gelatinous mass during the latter stages of augering than during the first,
    j. separating the gelatinous mass from the liquid,
    k. removing the gelatinous mass from the press, and
    m. transporting said gelatinous mass from the press to an offal cooker.

2. A slaughterhouse structure comprising gelatinizer and an auger press for processing blood having
    a. the gelatinizer in the form of closed vessel,
    b. a blood feed line entering into said vessel,
    c. a steam line connected to a source of steam entering into said vessel,
    d. a blow pipe exiting from said vessel,
    e. an exit valve in said blow pipe,
    f. a blood valve in the blood line,
    g. a steam valve in the steam line,
    h. the press having an auger mounted within a
    j. perforated and appertured cylinder,
    k. means for rotating said auger,
    m. said means for rotating said auger includes
       (i) an electric motor connected through a variable speed transmission whereby the speed of rotation of the auger may be varied,
    n. said auger having a mandril with flights thereon,
    o. said blow pipe entering into said auger press at
    p. a feed chamber on a feed end of the auger,
    q. said flights at the feed end being spaced wider apart than at the other end which is the press end of the press,
    r. said mandril having a smaller diameter at the feed end than at the press end,
    s. the feed chamber has a Y therein, and
    t. a gravity pipe entering said Y,
    u. said gravity pipe having a gate valve therein whereby material is gravity fed into said auger.

* * * * *